UNITED STATES PATENT OFFICE.

HANS M. OLSON, OF LOMPOC, CALIFORNIA, ASSIGNOR OF ONE-FOURTH TO HERMAN W. BECKER, ONE-FOURTH TO MAURICE A. BALAAM, AND ONE-FOURTH TO ARTHUR G. BALAAM, ALL OF SANTA BARBARA, CALIFORNIA.

HEAT-INSULATING COMPOSITION.

1,257,922.

Specification of Letters Patent.  Patented Feb. 26, 1918.

No Drawing.  Application filed August 23, 1917.  Serial No. 187,851.

*To all whom it may concern:*

Be it known that I, HANS M. OLSON, a citizen of the United States, and a resident of Lompoc, in the county of Santa Barbara and State of California, have invented a new and Improved Heat-Insulating Composition, of which the following is a full, clear, and exact description.

This invention relates to a plastic composition and particularly to an improved insulating composition which effectively resists the action of heat.

The object in view is to provide a composition made up of an infusorial earth, and a binder which will insulate and resist the disintegrating effects of heat.

Another object in view is to utilize pulverized kieselguhr, diatomaceous earth, or non-crystalline silica, and a suitable binder with a given quantity of water for making the mortar, which may be used in different ways, including the molding of the composition into commercial articles.

In producing mortar for use at different points desired, or for producing a composition for forming brick slabs or other articles, considerable variations in the proportions may be utilized without departing from the spirit of the invention, and also anything which may act as an equivalent may be utilized without departing from the spirit of the invention. However, a preferable mixture or composition is produced by using 88% of dry pulverized infusorial (kieselguhr diatomaceous) earth, 1% sodium sulfate, 1% aluminum sulfate, and 10% lime. Ordinarily the limits to which the different ingredients may be used are seventy five to ninety five per cent. infusorial earth of the entire mass and a binder of from five to twenty five per cent. of the entire mass. After a given quantity has been provided and assembled with these proportions, the mixture is gaged or wet with approximately 100% by weight of water, and after the complete mixture has been thoroughly stirred it is in the form of a mortar and may be used as a mortar in the ordinary sense wherever desired or may be used for molding or casting slabs, bricks, or any article desired. It is to be noted that by using the pulverized infusorial earth a substantially clean earth can be utilized, as objectionable matter may be rejected, so that a finished brick or other article will contain more and a higher grade of earth than a solid block cut out from a natural deposit. By reason of this fact the brick or other article is more refractory and more highly insulating than the brick sawed from the natural product, while at the same time permitting the operator to mold an article of the proper shape.

What I claim is:

1. A refractory composition consisting of infusorial earth in a finely divided state, sodium sulfate, aluminum sulfate and lime.

2. A refractory composition consisting of pulverized infusorial earth, and a binder including a small percentage of sodium sulfate.

3. A refractory composition consisting of infusorial earth in a finely divided state, and a binder therefor including in its composition aluminum sulfate.

4. A refractory composition consisting of infusorial earth in a finely divided state, and a binder therefor, said binder including in its composition sodium sulfate and lime.

5. A refractory composition consisting of infusorial earth in a finely divided state, and a binder therefor, said binder including in its composition aluminum sulfate and lime.

6. A refractory composition consisting of infusorial earth in a finely divided state, and a binder therefor consisting of sodium sulfate, aluminum sulfate and lime, said infusorial earth being from 75% to 95% of the entire mass, and said binder from 5% to 25%.

7. A refractory composition consisting of infusorial earth in a finely divided state, sodium sulfate, aluminum sulfate and lime, the infusorial earth being more than half of the entire mass.

8. A refractory composition consisting of 88% pulverized infusorial earth, 1% sodium sulfate, 1% aluminum sulfate, and 10% lime.

HANS M. OLSON.